350-167

CROSS REFERENCE

SEARCH ROOM 178
5.4

X2565
X2556

May 1, 1956 P. M. G. TOULON 2,744,156

ELECTRO OPTICAL SCREENS FOR COLOR TELEVISION

Filed May 16, 1950 3 Sheets-Sheet 1

INVENTOR.
PIERRE MARIE GABRIEL TOULON
BY Schairo & Lieberman
ATTORNEYS.

ELECTRO OPTICAL SCREENS FOR COLOR TELEVISION

Filed May 16, 1950 3 Sheets-Sheet 2

INVENTOR.
PIERRE MARIE GABRIEL TOULON
BY Schauss & Lieberman
ATTORNEYS.

ELECTRO OPTICAL SCREENS FOR COLOR TELEVISION

Filed May 16, 1950 3 Sheets-Sheet 3

*INVENTOR.*
PIERRE MARIE GABRIEL TOULON
BY
Schauer & Lieberman
ATTORNEYS.

2,744,156

ELECTRO OPTICAL SCREENS FOR COLOR TELEVISION

Pierre Marie Gabriel Toulon, New York, N. Y., assignor, by direct and mesne assignments, of seventy-five per cent to Products & Licensing Corporation, New York, N. Y., a corporation of Delaware, and twenty-five per cent to Nelson Moore and William D. Hall, as joint tenants

Application May 16, 1950, Serial No. 162,327

7 Claims. (Cl. 178—5.4)

The present invention relates generally to a system for receiving television pictures in color, and more particularly to systems for generating colored television pictures by means of apparatus including cathode ray tubes which produce monochromatic or black and white pictures, the latter being translated into colored images by means of suitable optical systems.

One known method of producing colored television pictures from monochromatic pictures available on the face of a cathode ray tube comprises the use of rotating discs having colored sectors corresponding with the three primary colors, which, properly blended, serve to reproduce any color present in the picture. The primary colors referred to may be, for example, red, yellow and blue. Television signals are transmitted to the receiver in the form of three successive monochromatic images, and these images are viewed through the colored sectors, each through a suitable colored sector, by rotating the sectors before the monochromatic image in succession, and the psychological characteristics of the observer then serve to recreate a colored picture by synthesis of the three colors in the eye or mind. The rotating disc which comprises the colored sectors must be driven by a motor, which is synchronized in its rotation with the separate frames of the monochromatic image. The system, therefore, has the disadvantage of being cumbersome, and limited in respect to the size of screen which may be employed, since each sector of the disc must be sufficiently large to cover the entire screen of the cathode ray tube. It is found that when a large disc is rotated at high velocity, as is essential in colored television systems of the type described, considerable noise, vibration, and motion of air, is produced, and further that the magnetic and electric fields present in the motor react on the television receiver, and produce interference therein.

It is a primary object of the present invention to provide a system of color television reception wherein colored images are produced from monochromatic elementary images by means of a mechanically movable device which is required to move over very small distances only.

It is another broad object of the present invention to provide a system of color television reception wherein color pictures are produced from monochromatic images by means of an optical system which is not required to move.

A further object of the invention resides in the provision of colored television pictures from monochromatic images by means of an optical system comprising birefringent material which is subjected to mechanical stresses in synchronism with image production.

It is still a further object of the invention to provide a system of color television reception wherein colored pictures are produced in response to monochromatic images by means of an optical system which includes a movable screen comprising line portions colored in the primary colors, and which is caused to oscillate rapidly through a small distance before the monochromatic images in order to recreate colored pictures.

It is a primary object of the invention to provide circuits for generating the voltages required for controlling the optical systems of the invention.

The above and still further objects, features and advantages of the invention will become apparent upon consideration of the following detailed description of various embodiments thereof, particularly when taken in conjunction with the accompanying drawings wherein.

Figures 1, 2:
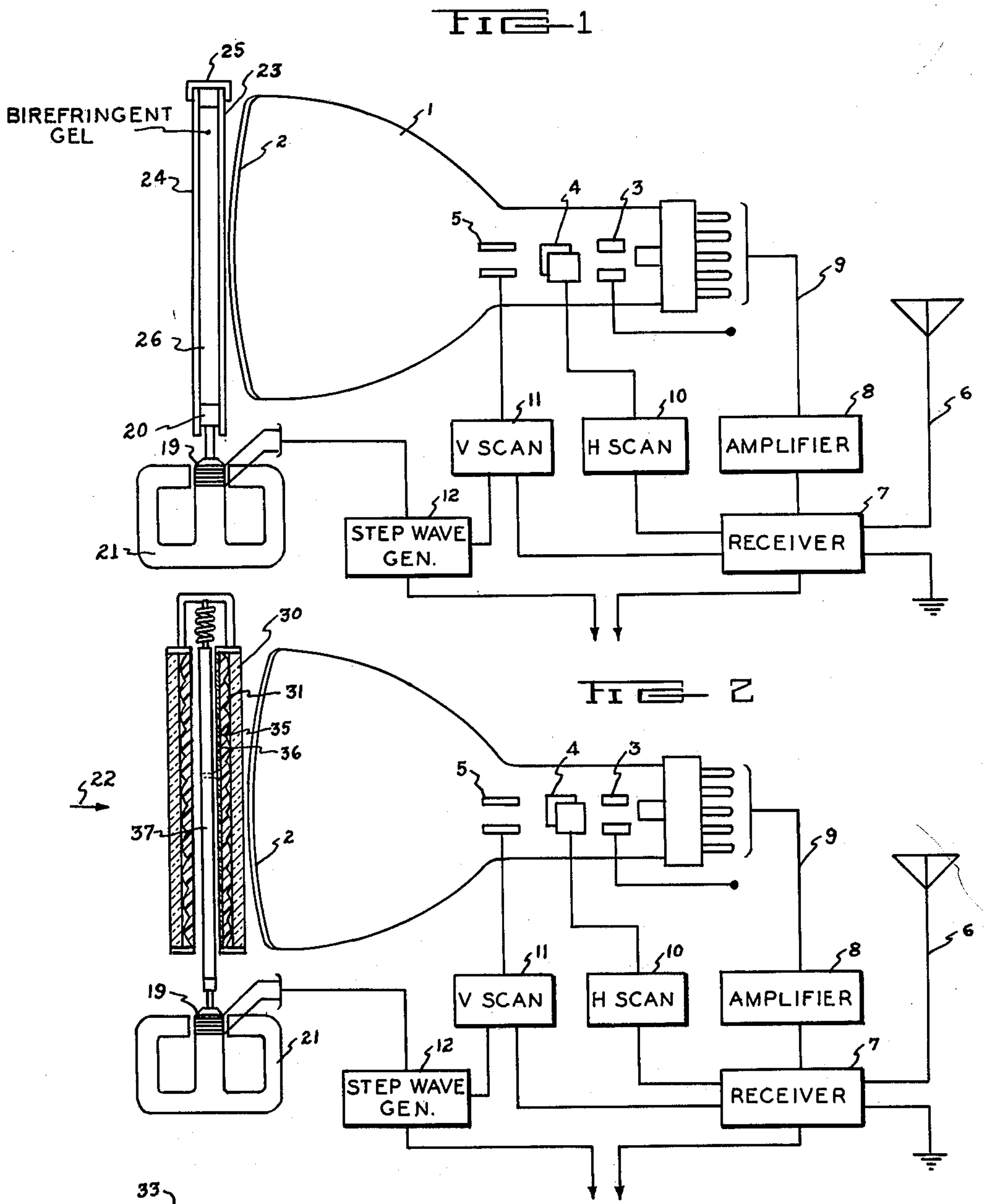
Figure 1 is a schematic block diagram of a first embodiment of the invention in which use is made of the birefringent properties of a birefracting substance interposed between monochromatic images and the eye of an observer.
Figure 2 is a modification of the system of Figure 1 wherein a screen having colored image elements is vibrated before a cathode ray tube, on the face of which is produced monochromatic pictures, to generate colored pictures.

Briefly described in accordance with the present invention, monochromatic picture images are produced on the face of a cathode ray tube indicator by means of techniques which are per se well known in the art of television reception and picture reproduction. The synchronizing signals which are comprised in the composite television signals as transmitted from a broadcasting station, or otherwise supplied, are applied to a stepped wave generator, which generates a stepped voltage wave, synchronized with image production, so that the wave has different levels while the monochromatic image representative of the blue component of the colored picture is being generated on the cathode ray tube indicator, while the yellow-green component is being generated, and while the red component is being generated. The stepped voltage is applied to a vibrator device or other control device for an optical system, and which is responsive to electrical current or voltage. One simple example of such a vibrator device is the voice coil of a conventional loud speaker.

Various types of optical systems may be employed. In accordance with one embodiment of the invention the optical system comprises a first sheet of polarizing material, which polarizes the light emanating from the fluorescent screen of the cathode ray tube, when a monochromatic picture component is generated thereon. Separated from the polarizing sheet is an analyzing sheet of polarizing material, with its axis of polarization perpendicular to the axis of polariztaion of the first sheet. Between the two sheets is inserted a birefracting substance, the refracting properties of which may be modified at will in response to pressure.

Specifically, this embodiment of the invention envisages utilization of a transparent birefringent substance, in the form of a gelatine of known character, the refringence of which varies when the material is submitted to compression or tension. The compressive or tensive forces may then be applied by an electrodynamic device, which is responsive to the stepped wave shape, and the magnitude of the stepped portions of the wave shape may be so selected as to generate the required colored outputs in response to the monochromatic images.

In accordance with another modification of the invention, the optical system is comprised of two lenticular screens of transparent material, the lenticulations corresponding with cylindrical lenses, generally concave and facing one another. Interposed between the two screens is a thin movable screen, having thereon groups of lines, each group comprising primary colors, such as yellow, red and blue, in parallel line pattern. The pitch separating each group of lines is equal to the pitch of the cylindrical lenses. The lenticular screen which is closest to the cathode ray screen divides the monochromatic image there generated into a plurality of separate lines, which, by the action of the lenses are reduced in size. The reduced lines are then passed through the movable screen having thereon the colored lines, and thereafter the second group of cylindrical lenses reamplifies the lines to their original size. Accordingly, as the colored screen vibrates in synchronism with the generation of sequential monochromatic images representative of differently colored components of the final picture, the monochromatic picture elements, which in this case correspond with lines of the picture, are translated into different ones of the primary colors. The sequential translation of the monochromatic image elements into primary colored image elements takes place at a sufficiently rapid rate as to present to the mind of the observer a colored image element of intermediate hue.

The generation of the step voltages may be accomplished in a variety of manners. In accordance with one embodiment of the invention, illustrated in Figure 5 of the drawings, step voltage is generated by a rotating mechanical switch, which applies to the control electrode of a vacuum tube amplifier stepped D.-C. biases deriving from a source of D.-C., and the output of the amplifier then represents stepped currents or voltages corresponding with the biases.

In accordance with a further embodiment of the invention, an oscillator is utilized to generate an alternating current voltage which is synchronized with picture production. The alternating current voltage is separated into three phase voltage, the phase difference being 120°, and each of the separate phases is rectified by means of a differently biased rectifier, whereby to produce the desired stepped voltages.

A similar system may be employed wherein the initial source of alternating voltage is derived from a 60 cycle power line. Systems of this character may be employed where the transmitter and receiver are powered from a common power system, so that the 60 cycle voltages will be of the same phase and frequency at both transmitter and receiver.

In accordance with a preferred embodiment of the invention, translation of the monochromatic images into primary colored images may be accomplished by purely electrostatic means, which specifically may comprise a birefringent crystal, having transparent electrodes in contact therewith. Voltage applied to the electrodes modifies the color of the light transmitted through the crystal.

Referring now more specifically to the accompanying drawings, and particularly to Figure 1, reference numeral 1 identifies a cathode ray tube having a fluorescent face 2 internally thereof. A conventional gun 3 is utilized to generate a beam of electrons, and to impel the beam of electrons toward the screen 2. The beam of electrons may be deflected in two directions by horizontal deflecting electrodes 4 and vertical deflecting electrodes 5, in accordance with practices well known in the art.

Television signals, including video and synchronizing signal components, are received by means of an antenna 6 and applied thereby to a receiver 7. The receiver 7 separates from the composite television picture the video elements, which are amplified in an amplifier 8 and applied via line 9 to the intensity control grid of the cathode ray tube 1, serving to control the intensity of the beam in accordance with the video components of the picture.

There is additionally connected to the output of the receiver 7 a circuit 10 which separates from the composite signal the horizontal synchronizing signals, and which generates in response to the latter a horizontal scanning voltage, for application to horizontal deflection electrodes 4. Still further, there is connected to the output of the receiver 7 a circuit 11 which separates out from the composite signal the vertical synchronizing signals and which generates in response to the latter a vertical scanning voltage which is applied to the vertical deflection electrodes 5. Accordingly, monochromatic images are produced on the fluorescent screen 2.

Additionally, the output of the receiver 7 is applied to a step wave generator 12, which generates in synchronism with the vertical scanning signals, or in synchronism with sequential reproduced images of monochromatic character, which appear on the fluorescent screen tube in response to the composite signal, a stepped voltage wave.

It may be assumed that color television picture signals are being transmitted for reception by receiver 7, which consists of video signals representative, for example, in sequence of the primary colored (blue, yellow-green and red) components of a colored television picture. These components being received in sequence, each for the time required to generate one frame or image on the fluorescent screen 2, result thereon in monochromatic images in sequence, which are representative of the blue, yellow-green and red components of the picture.

Figure 4:
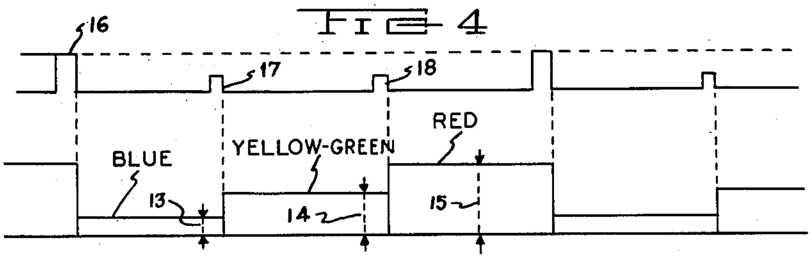
Figure 4 is a wave form diagram, showing the relation of the voltages which control the optical systems of Figures 1 and 2.

The stop voltage generated by the step wave generator 12 is illustrated in Figure 4 of the accompanying drawings, wherein the voltage 13 is transmitted while the monochromatic image on the face of the cathode ray tube indicator represents the blue portion of the picture signal; 14 the value of the step voltage during yellow-green transmission; and 15 the step voltage during red transmission. Synchronization of the step voltages 13, 14 and 15 is accomplished in response to synchronizing pulses represented at 16, and it will be noted that these synchronizing voltages are of different amplitudes than are synchronizing voltages 17, 18, which may be transmitted at the end of each primary color image component of the final color picture. By having one of the synchronizing voltages, as 16, of greater amplitude than the others, confusion in respect to synchronization is avoided, and selection of the proper color for succeeding frames assured.

Assuming now that the step voltages comprising steps 13, 14 and 15, as illustrated in Figure 4, are generated by the step wave generator 12, and that proper synchronization has been attained, the output of the step wave 12 is applied to a movable coil 19, which actuates a plunger 20. The movable coil 19 is associated with a permanent magnet 21, in a manner which is common in the construction of electrodynamic loud speakers, so that the current flowing in the coil 19 exists in the magnetic field produced by the armature 21, whereby force is exerted on the coil 19 when current flows therein, the force being proportional to the current. When force is exerted by the coil 19 the plunger 20 is actuated, and the motions of the plunger 20 correspond then with the values of voltages 13, 14 and 15.

Interposed between the fluorescent screen 2 and the observer 22 is a first sheet of polarizing material 23, separated, from a second sheet of polarizing material 24 by a small distance, the two sheets 23 and 24 being supplied with end members, as 25, to provide a completely enclosed volume. Enclosed by the volume is a mass of birefringent material, of which many examples are known, and which may have the physical form of a gel 26. The plane of polarization of the sheet 23 is at right angles to the plane of polarization of the sheet 24, so that in the absence of the gelatine 26 no light would pass through the sheets 23, 24 in sequence. The function of the gelatine or birefringent material, is to rotate the plane of polarization of any light passing therethrough, and as is well known the total rotation accomplished is determined by the tension or pressure exerted on the gelatine and on the wave length of the light involved.

The application of force to the gelatine is accomplished by means of the piston 20. This piston is arranged to extend across the entire width of the sheets 23, 24, and in the absence of compression the gelatine 26 is homogeneous so that no light appears to the observer 22 from the fluorescent screen 2. When there is a slight compression of the gelatine, an image is transmitted which appears to be violet. As the compression is increased the image becomes blue. With still greater pressure the image appears yellow, and finally with still greater pressure it appears red.

It will be understood that the order of the color changes may be made to vary in accordance with the character of the force variations applied to the piston 20, and by varying the nature of the birefringent material which is utilized intermediate the plates 23 and 24.

Since in the present instance the force applied to the piston 20 corresponds with the voltages 13, 14 and 15, by selecting these voltages suitably the sequential transmission of current through the optical system comprising polarizing plates 23, 24 and birefringent material 26, may be made to appear sequentially as blue, yellow and red, or blue, yellow-green and red, and accordingly, the monochromatic picture which normally appears on the fluorescent surface 2 may be translated into a color television picture, having any desired color shadings.

Figure 3:
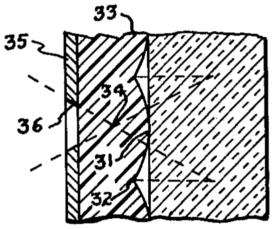
Figure 3 is an enlarged detail of a portion of the optical system of Figure 2.

A modification of the system illustrated in Figure 1 of the accompanying drawings is illustrated in Figures 2 and 3, corresponding elements of Figures 1 and 2 being identified by the same numerals of reference.

The system of Figure 2 differs from that of Figure 1 only in respect to the character of the optical systems employed. In the system of Figure 2, as in the system of Figure 1, monochromatic picture images are generated on the face of the fluorescent screen 2, these images as they succeed one another representing blue, yellow-green and red components of the complete color picture. In accordance with the invention there is provided a lenticularly surfaced transparent plate 30, the lenticulations being convergent. The lenticulations 31 each provides a condensing lens for one line of the picture, the distance from 32 to 33 along the lens being precisely equal to the width of a line of the picture as generated by the cathode ray beam of the cathode ray tube 1. The focal point of such lens 31 is indicated at 34, and located slightly beyond the focal distance is a further plate 35 having therein one linear aperture 36 for each line of the picture, the height of the aperture being one-third the height of the line of the picture, or one-third the distance between points 32 and 33 on the lens 31. The plates 30 and 35 remain stationary. There is, accordingly, present beyond the sheet 35, i. e., on the far side of the sheet 35 with respect to the lens 31, a reproduction of the image on the face of the cathode ray tube fluorescent screen 2, with the lines separated and reduced in size to one-third their original height. Adjacent to the screen 35 is a moving plate 37 which possesses groups of three horizontal lines adjacent to one another and in different ones of the primary colors, one group for each line of the picture, and the total height of each one of the colored lines being equal to the height of the slot 36. As the plate 37 vibrates lines of a corresponding color, as blue, yellow-green, red, are brought in sequence before the slots 36 and illuminated by the picture appearing on the face of the cathode ray tube screen 2. By vibrating the screen 37 in synchronism with the production of the separate primary colored components of the final colored picture, it is possible to reproduce the colored picture without requiring great movement of the plate 37, since the latter must move only over a distance equal to the width of one of the lines of the picture as it appears on the fluorescent screen 2. The width of the separate lines may then be amplified to original size by divergently lenticulated screen 30.

Figures 5, 7:
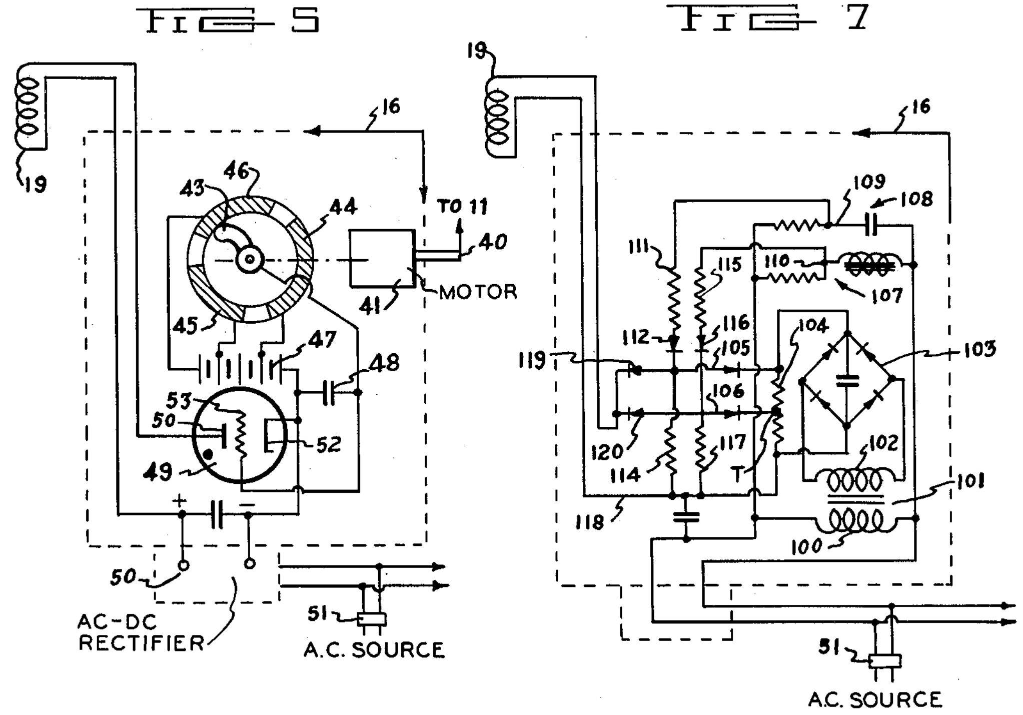
Figure 5 is a schematic circuit diagram of a portion of the systems of Figures 1 and 2 wherein is produced the wave forms of Figure 4.
Figure 7 is a schematic circuit diagram of a modification of the circuits of Figures 5 and 6.
Figure 6:
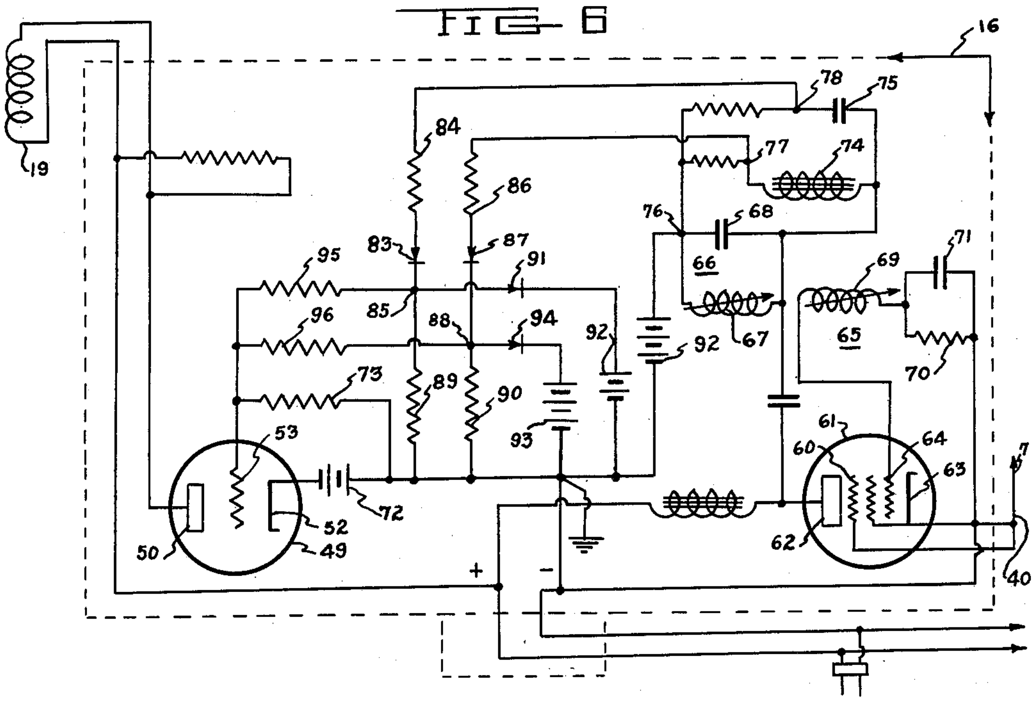
Figure 6 is a modification of the system of Figure 5.

Reference is now made to Figures 5, 6 and 7 wherein are illustrated various embodiments of electrical circuits capable of producing the step voltage of Figure 4, and, therefore, representing the block 16 which generates the voltages applied to the actuating coils 19.

Referring first to Figure 5 of the accompanying drawings, the reference numeral 40 represents the lead which provides frame synchronizing signals from the receiver 7, and representative of the pulses 16 (Figure 4), and effect controlled rotation of the synchronous motor 41, so that the latter rotates one revolution for each three frames of the picture, which may be in sequence, blue, yellow-green and red. The motor 41 rotates the arm 42 of a commutator 43, having three segments 44, 45, 46. The segments are each connected with a different voltage point on a battery or other voltage source 47, a smoothing condenser 48 being connected between rotating arm 42 and the zero voltage terminal of the voltage source 47, so that as the arm rotates steady step voltages corresponding with those shown in Figure 4 will be developed on the condenser 48.

A vacuum tube amplifier 49 is provided, having an anode 50 connected in series with actuating winding 19, and with the positive terminal of an A.-C. to D.-C. rectifier 50, which is supplied from a commercial source of power indicated by a plug 51. The cathode 52 of the amplifier tube 49 is connected to the negative terminal of the A.-C. to D.-C. rectifier 50, as is the zero voltage terminal of the condenser 48, and the control electrode 53 of the vacuum amplifier tube 49 is connected to the other terminal of the condenser 48, so that there is applied as a control voltage to the amplifier tube 49 stepped voltages 13, 14 and 15 illustrated in Figure 4. Accordingly, the plate current of the amplifier tube 49 corresponds with the stepped voltage of Figure 4 and actuates the winding 19 accordingly.

Referring now more particularly to Figure 6 of the drawings there is illustrated an all electronic system for developing the stepped voltages 13, 14, 15 of Figure 4. In the system of Figure 6 the synchronizing signals 17 which occur at the end of each frame representative of one of the primary colors of the final colored picture is applied over lead 40 to a control electrode 60 of a vacuum tube 61, having an anode 62, a cathode 63 and a further control electrode 64. The vacuum tube 61 forms part of an oscillator 65, having an oscillating plate tank circuit 66 comprising an inductance 67 and a condenser 68, and having a grid coil 69 which is coupled to the tank circuit 67. A resistor 70 by-passed by a smoothing condenser 71 is provided in the circuit of the control electrode 64 to generate the necessary operating bias. The oscillator 65 is arranged to oscillate at the frequency of the pulses 16, or at one-third the frequency of the pulses 17, 18. Stated in terms of image frequency, the oscillator has a frequency equal to one-third the image frequency, so that it goes through one complete oscillation while a blue, yellow-green and red picture is received, in succession.

A vacuum tube amplifier 49 is provided as in the system of Figure 5, the plate current of which actuates coil 19. Control electrode 53 of the amplifier tube 49 is normally connected to a fixed bias source 72 through an isolating resistor 73, so that the coil 19 is normally maintained in a position representative of blue image, or otherwise stated the bias on the tube 49 is equal to the voltage 13 in Figure 4.

The voltage available across the tank circuit 66 is applied in parallel to two phase shifting circuits, one comprising an inductance 74 and the other a condenser 75, so that the phase shifts present between one terminal 76 of the tank circuit 66 and the center points 77, 78 of the phase shifting circuits comprising inductance 77 and condenser 75 are in opposite directions, and equal in magnitude each to 60°.

Figure 8:
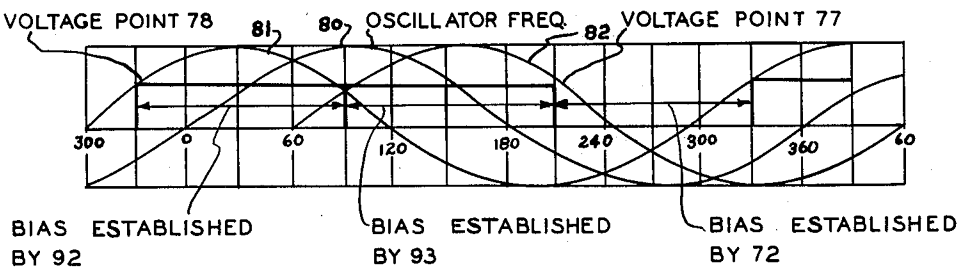
Figure 8 is a wave form diagram, used in explaining the operation of the systems of Figures 6 and 7; and, Figure 9 is a modification of the systems of Figures 1 and 2 in which electrostatic control is employed, and wherein no moving parts are required.

As will be evident from study of Figure 8 of the drawings, the oscillator and its phase shifting circuits together generate a three phase voltage, by reason of the 60° phase shifts accomplished in the phase shift circuits, so that if plot 80 represents the output of the oscillator in terms of voltage, plot 81 represents the positive portions of the voltage available at point 78, and plot 82 the positive portions of the voltage available at point 77, and the three voltages are equally phased. The wave 81 available at point 78 is applied through a rectifier 83 and a current limiting resistor 84 to a junction point 85. The voltage available at point 77 is applied through a current limiting resistor 86 and a rectifier 87 to a junction point 88. The junction point 85 is connected through a load resistance 89 to ground and junction point 88 is connected through a load resistance 90 to ground.

Junction point 85 is further connected through a rectifier 91 and bias battery 92 to ground, the rectifier 91 being so poled and the bias voltages having such polarity that the rectifier 91 is blocked so long as the voltage of junction point 85 is less than some predetermined value, which may be assumed in the present case to be voltage represented in Figure 4 by 15. When the voltage at junction 85 exceeds this value, the rectifier 91 becomes conductive, so that the rectifier 91 acts as a clipper for voltage on the junction point 85. A similar arrangement involving rectifier 94 and battery 93 is applied to junction point 88, values being so selected that the voltage of the junction point 88 cannot exceed the voltage value 15 as illustrated in Figure 4.

The voltage available at the junction point 85 is transferred via isolating resistance 95 to control electrode 53, and the voltage available at junction point 88 is transferred via isolating resistance 96 to control electrode 53. On the other hand, the voltage 80 of the oscillator prior to phase shift is not rectified or utilized to establish bias for the control electrode 53.

It follows that while the wave form 80 is positive the total bias on control electrode 53 is that established by battery or voltage source 52. When wave form 81 becomes sufficiently positive the bias on control electrode 53 is that established at junction point 85, and when wave form 82 becomes sufficiently positive the bias on control electrode 53 is that estabilshed on junction point 88. By reason of the clipping action of the rectifiers 91 and 94 these voltages are of square shape substantially, and, accordingly, the tube 49 is biassed in succession to three values corresponding to the values illustrated at 13, 14, 15 of Figure 4. The successive biases established on the tube 49 serve to actuate the coil 19. It will be realized in this connection that the direct output of the oscillator is not applied to the tube 49, in the present embodiment of the invention, although it is clearly possible, within the skill of those familiar with the art, to generate a suitable bias voltage from the output of the oscillator directly, by the same means which are employed for developing square bias waves from the phase shifted outputs. However, in the present embodiment of the invention the wave form 80 which is representative of the voltage available across the tank circuit 66, is not needed, since the same result may be accomplished directly by using the voltage source 72, thereby providing simplification of operation.

Reference is now made to Figure 7 of the accompanying drawings, wherein is illustrated a modification of the system of Figure 6 which essentially parallels that system in operation, but wherein the wave shape which is phase displaced and clipped is derived directly from a 60 cycle source rather than from an oscillator. Accordingly, the system of Figure 7 assumes that the same 60 cycle wave which is applied for synchronization and stepped wave development at the receiver, of which Figure 7 forms a part, has also been utilized to synchronize operations at the transmitter. It follows, in the system of Figure 7, that transmission of synchronizing signals from the transmitter becomes unnecessary, with consequent considerable simplification of the over-all system.

Referring now more specifically to Figure 7 of the drawings, there is shown an A.-C. source 51, which, for the sake of example, may be a 60 cycle source. This source is connected to the primary winding 100 of a transformer 101, having a secondary winding 102. The secondary winding is connected to a full wave rectifier of conventional character identified generally by the reference numeral 103. The rectified output of the rectifier 103 is developed across a load resistance 104, and the voltage so developed is utilized as bias means for rectifiers 105 and 106, there being applied the full voltage available across the resistance 104 as a bias source for rectifier 105, and only a portion of this voltage, by means of tap T, as a bias source for rectifier 106.

The voltage available across the primary winding is applied in parallel to two phase shifting circuits 107 and 108, the phase shifting circuit 107 being inductive in character, and the phase shifting circuit 108 capacitive in character, so as to produce phase shifts of opposite character, and the total phase shift produced in each of the phase shifting circuits is arranged to be 60°. Accordingly, a phase shifted voltage of advanced phase is available at junction point 109, and a phase shifted voltage of delayed phase is available at junction point 110, of the phase shifting circuits 108 and 107, respectively. The voltage available at the junction point 109 is applied through a current limiting resistance 111 through a rectifier 112 to a junction point 113, which is connected to ground via load resistance 114. Similarly, the voltage available at the junction point 110 is applied through a current limiting resistance 115, a rectifier 116 and a load resistance 117 to ground. Since the rectifiers 105 and 106 have their positive terminal or anodes connected respectively to the junction points 113 and 118, and are differently biased, a clipped voltage is developed at the junction point 113 and 118, and these clipped voltages have different values because the biases on the rectifiers 105 and 106 are different. The clipped voltages available at the junction points 113 and 116 are passed via rectifiers 119 and 120, respectively to the winding 19, the rectifiers 119 and 120 serving accordingly to isolate from one another the junction points 113 and 118. When neither of the phase shifted voltages has sufficient magnitude in a positive direction, the winding 19 remains unactuated. Hence, three discrete positions are established for winding 19, in sequence, as required by the present system.

Figure 9:
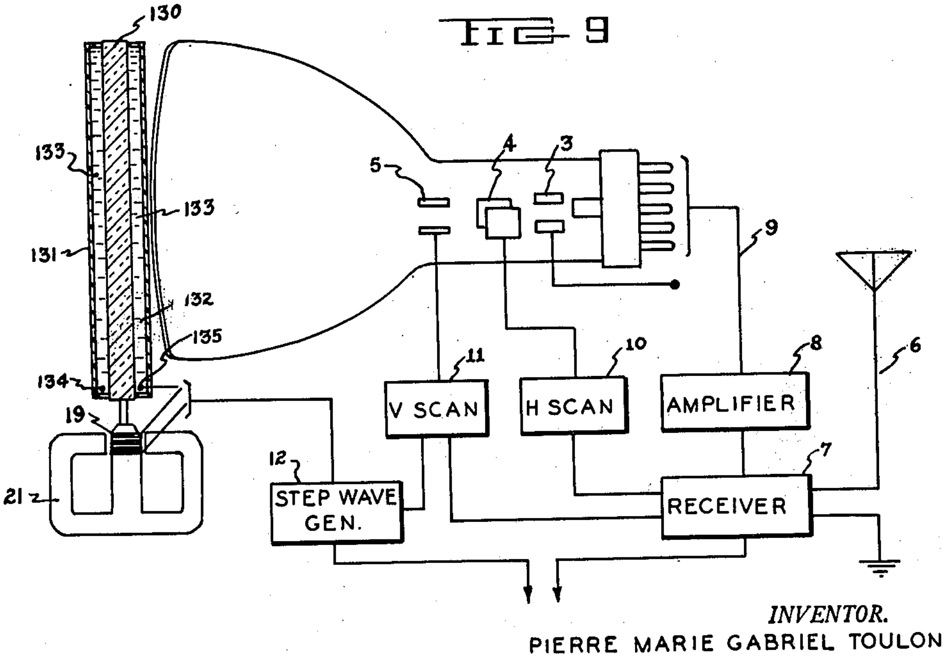

Reference is now made to Figure 9 of the accompanying drawings, wherein is illustrated a device for translating monochromatic images into colored images in response to control voltages, as 13, 14, 15, and comprising no moving parts. Specifically a birefringent crystal 130 is employed, placed before fluorescent surface 2 of cathode ray tube 1, on which is generated successive images, as in the systems of Figures 1 and 2.

To the sides of the crystal 130 are secured plastic or other transparent walls 131, 132 spaced from the crystal slightly. In the spaces between walls 131, 132 and crystal 130 is inserted a transparent liquid, as water 133, having a salt dissolved therein to render the water electrically conductive. Probes 134, 135 are then inserted in the liquid and the voltages 13, 14, 15 applied to the probes instead of to coil 19. To eliminate the possibility of dissolution of the crystal in the liquid, the crystal may be coated with a thin layer of non-hydroscopic transparent material, as varnish.

While I have described and illustrated specific forms of the invention, it will be clear that variations thereof may be resorted to without departing from the true scope of the invention as defined in the appended claims.

What I claim and desire to secure by Letters Patent of the United States is:

1. In a color television system, a cathode ray tube indicator having a fluorescent face, means for generating on said fluorescent face by line scanning successive monochromatic picture images at a predetermined recurrence rate, an optical structure adjacent said face for viewing successive ones of said monochromatic picture images in different colors, a source of stepped voltage synchronized with said recurrence rate, and means responsive to said stepped voltage for actuating said optical structure, said optical structure comprising first and second optical means and a vibrating transparent screen interposed between said first and second optical means and having thereon groups of transparent primary colored lines, each group having a height substantially equal to the height of one of the lines produced by scanning, said first optical means including means for reducing the height of said lines produced by scanning by two thirds, to provide reduced lines, means for passing said reduced lines through said vibrating screen, said second optical means including means for optically expanding the reduced lines after passage through said vibrating transparent screen, and means for controlling the vibrations of said screen to pass said reduced lines through said primary colored lines in sequence, said vibrating screen being so positioned between said first and second optical means that the respective lines of light transmitted thereby are at their narrowest dimension.

2. In a color television system, a cathode ray tube indicator having a fluorescent face, means for generating on said face in succession monochromatic picture images representative of the primary color components of a color television picture, by electronically scanning said fluorescent face in successive horizontal lines, means for translating said monochromatic picture images into primary color images in succession, said last means comprising an optical system, said optical system comprising voltage responsive means responsive to a first value of voltage for translating a monochromatic image into a first primary color image, responsive to a second value of voltage for translating a monochromatic image into a second primary color image, responsive to a third value of voltage for translating a monochromatic image into a third primary color image, means for generating a stepped voltage wave having in sequence said first, second and third values of voltage, means for synchronizing said voltage wave with said monochromatic picture images, and means for applying said voltage wave to said voltage responsive means, said optical system comprising first and second lenticular lens plates substantially parallel to said fluorescent face, the lenticulations of said first plate having corresponding lenticulations on said second plate and; the lenticulations of said plates being aligned with the lines of said images, lenticulations having each a width substantially equal to the width of a line of said images, a screen interposed between said first and second lens plates and having a group of three primary colored lines for each of said lenticulations on one of said plates, each group of primary colored lines having a height substantially equal to the height of a line of said images, each of said lenticulations of said first lens plate respectively concentrating the light of one of said lines on only one of said primary colored lines, and means for vibrating said screen controlled by said means for generating a stepped voltage wave to bring different ones of said primary colored lines of each group into registration with one of said lenticulations in succession.

3. In a system for transforming a monochrome image to a polychrome image, a vibrating transparent screen having thereon groups of transparent primary colored lines, the plane of said screen placed substantially parallel with the plane of said monochrome image, optical means located intermediate said monochrome image and said screen for transforming said image into a lined image having separations between the lines thereof, a further optical device located between said screen and the eye of an observer and cooperating with said first optical means for removing said separations between the lines and reconstituting said image and cyclic means for applying intermittent force to said screen.

4. In a system for transforming a monochrome image composed of a plurality of monochrome parallel lines of predetermined width to a polychrome image composed of an equal plurality of polychrome parallel lines, first optical means for optically condensing each of said monochrome lines to provide a further image having lines of further width less than said predetermined width, a color filter composed of a plurality of groups of primary color filter elements arranged in parallel lines each of predetermined width not smaller than said further width, said color filter being positioned to pass said further image, further optical means for optically expanding each of the lines of said further image as passed by said color filter to widths at least substantially equal to said first mentioned predetermined width, and means for relatively moving said color filter with respect to each of said optical means sufficiently to effect passage of the lines of said further image in succession through color filter elements of different primary colors.

5. In a system for transforming a monochrome linear picture element into a polychrome linear picture element, a plurality of superposed linear color elements each in a different one of the primary colors, the transverse dimension of said plurality of superposed color elements being substantially equal to the transverse dimension of said linear picture element, first optical means for reducing the transverse dimension of said linear picture element to substantially the transverse dimension of one of said linear color elements and for passing the thus reduced linear picture element in sequence through said linear color elements, second optical means for thereafter expanding the transverse dimension of said linear picture element and cyclic means for applying force to said linear color elements.

6. The system of claim 3 in which each of said optical devices has a lenticular surface, the said lenticular surfaces being substantially parallel to one another and to the plane of said screen, each of the lenticulations in one of said lenticular surfaces having a corresponding lenticulation respectively in the other of said lenticular surfaces.

7. The system of claim 3 in which said cyclic means comprises a signal responsive actuator coupled to said screen, and a step wave signal generator coupled to said actuator, said step wave generator including means for repetitively producing plural output signals of differing magnitudes for causing said actuator to apply repetitively different forces of predetermining magnitudes to said screen.

References Cited in the file of this patent

UNITED STATES PATENTS

| | | |
|---|---|---|
| 2,109,540 | Leishman | Mar. 1, 1938 |
| 2,343,971 | Goldsmith | Mar. 14, 1944 |
| 2,389,979 | Huffnagle | Nov. 27, 1945 |
| 2,457,415 | Sziklai | Dec. 28, 1948 |
| 2,493,200 | Land | Jan. 3, 1950 |
| 2,538,071 | Young | Jan. 16, 1951 |

FOREIGN PATENTS

| | | |
|---|---|---|
| 620,137 | Great Britain | Mar. 21, 1949 |